(12) United States Patent
Ding et al.

(10) Patent No.: US 9,491,647 B2
(45) Date of Patent: Nov. 8, 2016

(54) USER EQUIPMENT

(75) Inventors: Ming Ding, Pudong (CN); Lei Huang, Pudong (CN); Zeng Yang, Pudong (CN); Yuan Luo, Pudong (CN)

(73) Assignee: Sharp Kabushiki Kaisha, Osaka (JP)

( * ) Notice: Subject to any disclaimer, the term of this patent is extended or adjusted under 35 U.S.C. 154(b) by 86 days.

(21) Appl. No.: 14/129,255

(22) PCT Filed: May 23, 2012

(86) PCT No.: PCT/JP2012/063832
§ 371 (c)(1),
(2), (4) Date: Dec. 24, 2013

(87) PCT Pub. No.: WO2013/001968
PCT Pub. Date: Jan. 3, 2013

(65) Prior Publication Data
US 2014/0126408 A1 May 8, 2014

(30) Foreign Application Priority Data

Jun. 29, 2011 (CN) .......................... 2011 1 0178731

(51) Int. Cl.
| | | |
|---|---|---|
| *H04W 24/10* | (2009.01) | |
| *H04W 40/12* | (2009.01) | |
| *H04W 24/08* | (2009.01) | |
| *H04B 7/02* | (2006.01) | |
| *H04B 7/06* | (2006.01) | |

(52) U.S. Cl.
CPC ............. *H04W 24/08* (2013.01); *H04B 7/024* (2013.01); *H04B 7/0626* (2013.01)

(58) Field of Classification Search
None
See application file for complete search history.

(56) References Cited

U.S. PATENT DOCUMENTS

| | | | |
|---|---|---|---|
| 2011/0237282 A1* | 9/2011 | Geirhofer et al. ............ | 455/509 |
| 2012/0218962 A1 | 8/2012 | Kishiyama et al. | |

(Continued)

FOREIGN PATENT DOCUMENTS

JP       2011-82709 A       4/2011

OTHER PUBLICATIONS

3GPP TR 36.814 V9.0.0 (Mar. 2010), 3rd Generation Partnership Project; Technical Specification Group Radio Access Network; Evolved Universal Terrestrial Radio Access (E-UTRA); Further advancements for E-UTRA physical layer aspects (Release 9), pp. 1-104.
3GPP TSG RAN WG1 Meeting #54bis, R1-083546, "Per-cell precoding methods for downlink joint processing CoMP", Prague, Czech Rep., Sep. 29-Oct. 3, 2008, pp. 1-3.

(Continued)

*Primary Examiner* — Duc Duong
(74) *Attorney, Agent, or Firm* — Birch, Stewart, Kolasch & Birch, LLP

(57) ABSTRACT

A Channel State Information (CSI) feedback method and a User Equipment (UE) are provided for better support of Joint Transmission (JT) and Beamforming/Coordinated Scheduling (CB/CS). For JT, phase information for an adjacent Base Station (BS) is fed back. For CB/CS, enhanced CSI for an adjacent BS is fed back. The UE according to the present invention includes: a coordinated BS set determining unit configured for determining a set of coordinated BSs participating in multi-BS coordination, the set of coordinated BSs containing a serving BS and at least one non-serving BS; and a CSI feedback unit configured for feeding back CSI for JT or CB/CS for each non-serving BS in the set of coordinated BSs. The present invention has the advantages of simple implementation and low overhead and is applicable in LTE-A and 4G systems.

4 Claims, 3 Drawing Sheets

(56) References Cited

U.S. PATENT DOCUMENTS

| | | | | |
|---|---|---|---|---|
| 2012/0230274 | A1* | 9/2012 | Xiao | H04B 7/024 370/329 |
| 2012/0281556 | A1* | 11/2012 | Sayana et al. | 370/252 |
| 2012/0287799 | A1* | 11/2012 | Chen et al. | 370/252 |
| 2013/0003788 | A1* | 1/2013 | Marinier | H04B 7/024 375/219 |
| 2013/0258992 | A1* | 10/2013 | Seo et al. | 370/329 |
| 2013/0294352 | A1* | 11/2013 | Park | H04B 7/024 370/328 |
| 2013/0303180 | A1* | 11/2013 | Wang et al. | 455/450 |

OTHER PUBLICATIONS

3GPP TSG-RAN WG1 #58, R1-093720, "CoMP email summary", Shenzhen, China, Aug. 24-28, 2009, pp. 1-11 I.

3GPP TSG-RAN WG1 #65, R1-111516, "CoMP Phase 1 JP Evaluation Results", Barcelona, Spain, May 9-May 13, 2011, pp. 1-5.

International Search Report, issued in PCT/JP2012/063832, dated Jul. 3, 2012.

Written Opinion of the International Searching Authority, issued in PCT/JP2012/063832, dated Jul. 3, 2012.

* cited by examiner

USER EQUIPMENT

TECHNICAL FIELD

The invention relates to communication technology, and more particularly, to a Channel State Information (CSI) feedback method in a multi-Base Station (BS) coordination mode (or Coordinated Multi-Point, CoMP) and a User Equipment (UE) applying the same.

BACKGROUND ART

Multi-antenna wireless transmission technique, or Multiple Input Multiple Output (MIMO), can achieve spatial multiplex gain and spatial diversity gain by deploying a plurality of antennas at both the transmitter and the receiver and utilizing the spatial resources in wireless transmission. Researches on information theory have shown that the capacity of a MIMO system grows linearly with the minimum of the number of transmitting antennas and the number of receiving antennas. FIG. 1 shows a schematic diagram of a MIMO system. As shown in FIG. 1, a plurality of antennas at the transmitter and a plurality of antennas at each of the receivers constitute a multi-antenna wireless channel containing spatial domain information. Further, Orthogonal Frequency Division Multiplexing (OFDM) technique has a strong anti-fading capability and high frequency utilization and is thus suitable for high speed data transmission in a multi-path and fading environment. The MIMO-OFDM technique, in which MIMO and OFDM are combined, has become a core technique for a new generation of mobile communication.

For instance, the $3^{rd}$ Generation Partnership Project (3GPP) organization is an international organization in mobile communication field and plays an important role in standardization of 3G cellular communication technologies. Since the second half of the year 2004, the 3GPP organization has initiated a so-called Long Term Evolution (LTE) project for designing Evolved Universal Terrestrial Radio Access (EUTRA) and Evolved Universal Terrestrial Radio Access Network (EUTRAN). The MIMO-OFDM technique is employed in the downlink of the LTE system. In a conference held in Shenzhen, China in April 2008, the 3GPP organization started a discussion on the standardization of 4G cellular communication systems (currently referred to as LTE-A systems). In this conference, a concept known as "multi-antenna multi-BS coordination" gets extensive attention and support. Its core idea is that multiple BSs can provide communication services for one or more UEs simultaneously, so as to improve data transmission rate for a UE located at the edge of a cell.

With regard to the multi-antenna multi-BS coordination, fundamental agreements are mainly available from the following standard document by March, 2010: 3GPP TR 36.814 V9.0.0 (2010-03), "Further advancements for E-UTRA physical layer aspects (Release 9)", which can be outlined as follows:

In a multi-antenna multi-BS service, a UE needs to report channel state/statistical information of a link between the UE and each BS/cell in a set of cells. This set of cells is referred to as a measurement set for multi-antenna multi-BS transmission.

The set of BSs/cells for which the UE actually perform information feedback can be a subset of the measurement set and is referred to as a coordination set for multi-antenna multi-BS transmission. Here, the coordination set for multi-antenna multi-BS transmission can be the same as the measurement set for multi-antenna multi-BS transmission.

A BS/cell in the coordination set for multi-antenna multi-BS transmission participates in Physical Downlink Shared Channel (PDSCH) transmission for the UE, either directly or indirectly.

The scheme in which multiple BSs directly participate in coordination transmission is referred to as Joint Processing (JP). The JP scheme needs to share PDSCH signal of the UE among the multiple BSs participating the coordination and can be divided into two approaches. One is referred to as Joint Transmission (JT) in which the multiples BSs transmit their PDSCH signals to the UE simultaneously. The other one is referred to as Dynamic Cell Selection (DCS) in which at any time instance, only one of the BSs which has the strongest signal link is selected to transmit its PDSCH signal to the UE.

The scheme in which multiple BSs indirectly participate in coordination transmission is referred to as Coordinated Beamforming/Coordinated Scheduling (CB/CS). In this CB/CS scheme, instead of sharing PDSCH signal of the UE among the multiple BSs participating in the coordination, the beams/resources for transmission of PDSCHs for different UEs are coordinated among the multiple BSs to suppress the interference between each other.

For a UE operating in the multi-antenna multi-BS coordinated transmission environment, information feedback is mainly carried out separately for each BS and is transmitted over the uplink resources of the serving BS.

As used herein, the term "information feedback" refers to a process in which a UE needs to feed back CSI to a BS such that the BS can perform corresponding operations such as radio resource management. There are primarily the following three CSI feedback approaches in the prior art documents.

Complete CSI Feedback:

The UE quantizes all elements in a transceiver channel matrix and feeds back each of the elements to the BS. Alternatively, the UE can analogously modulate all elements in the transceiver channel matrix and feeds back them to the BS. Alternatively, the UE can obtain a transient covariance matrix for the transceiver channel matrix, quantizes all elements in the covariance matrix and feeds back each of the elements to the BS. Thus, the BS can reconstruct an accurate channel from the channel quantization information fed back from the UE. This approach is described in non-patent document 1: 3GPP RI-093720, "CoMP email summary", Qualcomm and its implementation is illustrated in FIG. 2.

Statistic-Based CSI Feedback:

The UE applies a statistical process on a transceiver channel matrix, e.g., calculating a covariance matrix thereof, quantizes the statistical information and then feeds back it to the BS. Thus, the BS can obtain statistical state information of the channel based on the feedback from the UE. This approach is described in non-patent document 1: 3GPP RI-093720, "CoMP email summary", Qualcomm and its implementation is illustrated in FIG. 3.

CSI Feedback Based on Codebook Space Search:

A finite set of CSI is predefined by the UE and the BS (i.e., codebook space, common codebook spaces including channel rank and/or pre-coding matrix and/or channel quality indication, etc.). Upon detection of a transceiver channel matrix, the UE searches in the codebook space for an element best matching the CSI of the current channel matrix and feeds back the index of the element to the BS. Thus, the BS looks up the predefined codebook space based on the index to obtain rough CSI. This approach is described in non-patent document 2: 3GPP, RI-083546, "Per-cell precoding methods for downlink joint processing CoMP", ETRI, and its implementation is illustrated in FIG. 4.

Among the above three approaches, the complete CSI feedback has the best performance, but is impractical to be applied to actual system due to the highest feedback overhead. In particular, in the multi-antenna multi-BS coordination system, its feedback overhead grows in proportional to the increase of the number of BSs and it is even more impractical. The CSI feedback based on codebook space search has the lowest feedback overhead, but is worst in terms of performance since it cannot accurately describe the channel state such that the transmitter cannot make full use of channel characteristics and cannot the perform transmission accordingly. However, it is extremely simple to implement and can typically accomplish feedback with a few bits. Hence, it is widely applied in actual systems. The statistic-based CSI feedback achieves a good tradeoff between these two approaches. When the channel state has significant statistical information, this approach can accurately describe the channel state with a relatively small amount of feedback, thereby achieving a relatively ideal performance.

Currently, in the LTE and the LTE-A systems, in consideration of factors for practical system implementation, the CSI feedback based on codebook space search is employed in a single cell transmission mode. In the multi-BS/cell coordination mode in the LTE-A system, it is expected that this CSI feedback based on codebook space search will continue to be used.

For the CSI feedback based on codebook space search, there are two feedback channels in the LTE system, a Physical Uplink Control CHannel (PUCCH) and a Physical Uplink Shared CHannel (PUSCH). In general, the PUCCH is configured for transmission of synchronized, basic CSI with low payload; while PUSCH is configured for transmission of bursty, extended CSI with high payload. For the PUCCH, a complete CSI is composed of different feedback contents which are transmitted in different sub-frames. For the PUSCH, on the other hand, a complete CSI is transmitted within one sub-frame. Such design principles remain applicable in the LET-A system.

The feedback contents can be divided into three categories: Channel Quality Index (CQI), Pre-coding Matrix Index (PMI) and Rand Index (RI), all of which are bit quantized feedbacks. The CQI typically corresponds to a transmission format having a packet error rate no more than 0.1.

In the LTE system, the following eight types of MIMO transmission approaches for downlink data are defined:

1) Single antenna transmission. This is used for signal transmission at a single antenna BS. This approach is a special instance of MIMO system and can only transmit a single layer of data.

2) Transmission diversity. In a MIMO system, diversity effects of time and/or frequency can be utilized to transmit signals, so as to improve the reception quality of the signals. This approach can only transmit a single layer of data.

3) Open-loop space division multiplexing. This is a space division multiplexing without the need for PMI feedback from UE.

4) Closed-loop space division multiplexing. This is a space division multiplexing in which PMI feedback from UE is required.

5) Multi-user MIMO. There are multiple UEs simultaneously participating in the downlink communication of the MIMO system.

6) Closed-loop single layer pre-coding. Only one single layer of data is transmitted using the MIMO system. The PMI feedback from UE is required.

7) Beam forming transmission. The beam forming technique is employed in the MIMO system. A dedicated reference signal is used for data demodulation at UE. Only one single layer of data is transmitted using the MIMO system. The PMI feedback from UE is not required.

8) Two-layer beam forming transmission. The UE can be configured to feed back PMI and RI, or not to feed back PMI and RI.

In the LTE-A system, the above eight types of transmission approaches may be retained and/or canceled, and/or a new transmission approach, dynamic MIMO switching, can be added, by which the BS can dynamically adjust the MIMO mode in which the UE operates.

In order to support the above MIMO transmission approaches, a variety of CSI feedback modes are defined in the LTE system. Each MIMO transmission approach corresponds to a number of CSI feedback modes, as detailed in the following.

There are four CSI feedback modes for the PUCCH, Mode 1-0, Mode 1-1, Mode 2-0 and Mode 2-1. These modes are combination of four types of feedbacks, including:

Type 1: one preferred sub-band location in a Band Part (BP, which is a subset of the Set S and has its size dependent on the size of the Set S) and a CQI for the sub-band. The respective overheads are L bits for the sub-band location, 4 bits for the CQI of the first codeword and 3 bits for the CQI of the possible second codeword which is differentially coded with respect to the CQI of the first codeword.

Type 2: wideband CQI and PMI. The respective overheads are 4 bits for the CQI of the first codeword, 3 bits for the CQI of the possible second codeword which is differentially coded with respect to the CQI of the first codeword and 1, 2 or 4 bits for PMI depending on the antenna configuration at BS.

Type 3: RI. The overhead for RI is 1 bit for two antennas, or 2 bits for four antennas, depending on the antenna configuration at BS.

Type 4: wideband CQI. The overhead is constantly 4 bits.

The UE feeds back different information to the BS in correspondence with the above different types.

The Mode 1-0 is a combination of Type 3 and Type 4. That is, the feedbacks of Type 3 and Type 4 are carried out at different periods and/or with different sub-frame offsets. In the Mode 1-0, the wideband CQI of the first codeword in the Set S and possibly the RI information are fed back.

The Mode 1-1 is a combination of Type 3 and Type 2. That is, the feedbacks of Type 3 and Type 2 are carried out at different periods and/or with different sub-frame offsets. In the Mode 1-1, the wideband PMI of the Set S, the wideband CQIs for the individual codeword and possibly the RI information are fed back.

The Mode 2-0 is a combination of Type 3, Type 4 and Type 1. That is, the feedbacks of Type 3, Type 4 and Type 1 are carried out at different periods and/or with different sub-frame offsets. In the Mode 2-0, the wideband CQI of the first codeword in the Set S, possibly the RI information as well as one preferred sub-band location in the BP and the CQI for the sub-band are fed back.

The Mode 2-1 is a combination of Type 3, Type 2 and Type 1. That is, the feedbacks of Type 3, Type 2 and Type 1 are carried out at different periods and/or with different sub-frame offsets. In the Mode 2-1, the wideband PMI of the Set S, the wideband CQIs for the individual codeword and possibly the RI information, as well as one preferred sub-band location in the BP and the CQI for the sub-band are fed back.

There are thus the following correspondences between the MIMO transmission approaches and the CSI feedback modes:

MIMO transmission approach 1): Mode 1-0 and Mode 2-0;

MIMO transmission approach 2): Mode 1-0 and Mode 2-0;

MIMO transmission approach 3): Mode 1-0 and Mode 2-0;

MIMO transmission approach 4): Mode 1-1 and Mode 2-1;

MIMO transmission approach 5): Mode 1-1 and Mode 2-1;

MIMO transmission approach 6): Mode 1-1 and Mode 2-1;

MIMO transmission approach 7): Mode 1-0 and Mode 2-0;

MIMO transmission approach 8): Mode 1-1 and Mode 2-1, with PMI/RI feedback from UE; or Mode 1-0 and Mode 2-0, without PMI/RI feedback from UE.

Still, CQI, PMI and RI are primary feedback contents in the single BS transmission approach of the LTE-A system. In order that the feedback modes for a UE are consistent with those corresponding to the transmission approaches 4) and 5) while supporting a new transmission approach 9), the Mode 1-1 and Mode 2-1 in the LTE-A system are optimized for a scenario where a BS is equipped with 8 transmission antennas. That is, a PMI is collectively determined from two channel pre-coding matrix indices, W1 and W2, where W1 represents wideband/long-term channel characteristics and W2 represents sub-band/short-term channel characteristics. For transmission of W1 and W2 over PUCCH, Mode 1-1 can be sub-divided into two sub-modes: Sub-Mode 1 of Mode 1-1 and Sub-Mode 2 of Mode 1-1; the original Mode 2-1 is also modified.

In order to support the newly defined feedback mode, the following feedback types is newly introduced in the LTE-A system:

Type 1a: one preferred sub-band location in a Band Part (BP, which is a subset of the Set S and has its size dependent on the size of the Set S) and a CQI for the sub-band, plus a W2 for another sub-band. The overhead for the sub-band location is L bits. The total overhead for the CQI and the W2 is 8 bits when RI=1, 9 bits when 1<RI<5, and 7 bits when RI>4.

Type 2a: W1. The overhead for W1 is 4 bits when RI<3, 2 bits when 2<RI<8, and 0 bit when RI=8.

Type 2b: wideband W2 and wideband CQI. The total overhead of the wideband W2 and the wideband CQI is 8 bits when RI=1, 11 bits when 1<RI<4, 10 bits when RI=4, and 7 bits when RI>4.

Type 2c: wideband CQI, W1 and wideband W2. The total overhead of the wideband CQI, the W1 and the wideband W2 is 8 bits when RI=1, 11 bits when 1<RI<4, 9 bits when RI=4, and 7 bits when RI>4. It is to be noted that, in order to control feedback overhead, the value range of the W1 and the wideband W2 here is obtained by down-sampling the full value range of the W1 and the wideband W2.

Type 5: RI and W1. The total overhead for the RI and the W1 is 4 bits for 8 antennas and 2-layer data multiplexing and 5 bits for 8 antennas and 4 or 8-layer data multiplexing. It is to be noted that, in order to control feedback overhead, the value range of the W1 here is obtained by down-sampling the full value range of the W1.

Type 6: RI and PTI. PTI stands for Pre-coding Type Indicator and has an overhead of 1 bit for representing information on pre-coding type. The total overhead for the RI and the PTI is 2 bits for 8 antennas and 2-layer data multiplexing, 3 bits for 8 antennas and 4-layer data multiplexing, and 4 bits for 8 antennas and 8-layer data multiplexing.

In this context, "W2" refer to "sub-band W2", while "wideband W2" will be referred to in their full expressions.

The Sub-Mode 1 of Mode 1-1, Sub-Mode 2 of Mode 1-1 and the new Mode 2-1 have the following relationship with the existing types and these new types:

The Sub-Mode 1 of Mode 1-1 is a combination of Type 5 and Type 2b. That is, the feedbacks of Type 5 and Type 2b are carried out at different periods and/or with different sub-frame offsets.

The Sub-Mode 2 of Mode 1-1 is a combination of Type 3 and Type 2/2c.

For transmission approach 4) or 8), the Sub-Mode 2 of Mode 1-1 is a combination of Type 3 and Type 2. That is, the feedbacks of Type 3 and Type 2 are carried out at different periods and/or with different sub-frame offsets.

For transmission approach 9), the Sub-Mode 2 of Mode 1-1 is a combination of Type 3 and Type 2c. That is, the feedbacks of Type 3 and Type 2c are carried out at different periods and/or with different sub-frame offsets.

The new Mode 2-1 relates to transmission approach 9) only and is a combination of Type 6, Type 2b and Type 2a/1a.

When the PTI of Type 6 is 0, the new Mode 2-1 is a combination of Type 6, Type 2b and Type 2a. That is, the feedbacks of Type 6, Type 2b and Type 2a are carried out at different periods and/or with different sub-frame offsets.

When the PTI of Type 6 is 1, the new Mode 2-1 is a combination of Type 6, Type 2b and Type 1a. That is, the feedbacks of Type 6, Type 2b and Type 1a are carried out at different periods and/or with different sub-frame offsets.

It is also to be noted that, in the multi-antenna multi-BS coordination, the JT and the CB/CS have different requirements on CSI. Specifically, the JT focuses on obtaining Phase Information (PI) between BSs such that an information coherence addition gain can be obtained. On the other hand, the CB/CS focuses on obtaining PMI information of a adjacent BS (including W1 and W2, W1 and W2 constituting the PMI information of a adjacent BS being referred to as enhanced W1 and enhanced W1, or eW1 and eW2, respectively), so as to effectively coordinate beams between the BSs, thereby eliminating interference. The JT and the CB/CS have different application scenarios. For example, if the background connection between BSs is reliable, the JT is applicable; otherwise the CB/CS is applicable. As another example, if a UE can accurately estimate the CSI of an adjacent BS, the JT is applicable; otherwise the CB/CS is applicable. As a further example, the closer a UE is located to the edge area of a cell, the more the JT is applicable; otherwise the CB/CS is applicable. Thus, if the UE can dynamically switch between the JT and the CB/CS based on the CSI, the data rate and/or the communication quality of the UE can be improved. The UE can apply any of the following switching criteria: calculating the data rate achievable by each of the JT and the CB/CS and selecting the approach achieving higher data rate; or calculating the bit error rate achievable by each of the JT and the CB/CS and selecting the approach achieving lower bit error rate; or any other criteria.

In summary, there are currently few references available for the CSI feedback for multi-antenna multi-BS coordination in the LTE-A system, as this has not been discussed in the standardization process. At present, the general concept is that the feedback contents involve CSI based on codebook space search, such as CQI, PMI and RI, and the information feedback is mainly carried out separately to each BS. In this architecture, there are still a number of issues to be researched. In particular, it is an important research topic on how to feed back CSI in the multi-BS coordination environment so as to be flexibly suitable for the JT and CB/CS transmissions.

SUMMARY OF INVENTION

It is an object of the present invention to solve the problem of incapability of dynamically supporting CSI feedback for JT and CB/CS transmissions in the prior art by providing a novel CSI feedback method and a UE.

According to the first aspect of the present invention, a User Equipment (UE) is provided, which includes: a coordinated Base Station (BS) set determining unit configured for determining a set of coordinated BSs participating in multi-BS coordination, the set of coordinated BSs containing a serving BS and at least one non-serving BS; and a Channel State Information (CSI) feedback unit configured for feeding back CSI for Joint Transmission (JT) or Coordinated Beamforming/Coordinated Scheduling (CB/CS) for each non-serving BS in the set of coordinated BS.

Preferably, the CSI feedback unit is configured for indicating whether the fed back CSI is for JT or for CB/CS by using a Coordinated Multi-Point (CoMP) Type Indicator (CTI) in the CSI fed back to each non-serving BS.

Preferably, the CSI feedback unit is configured for determining whether to feed back CSI for JT or for CB/CS based on a system parameter configured by the serving BS in a semi-static manner via high layer signaling or MAC signaling.

Preferably, the CSI feedback unit is configured for including the CTI in a feedback Type 5 to form a new feedback Type 5 in Sub-Mode 1 of feedback Mode 1-1, and feeding back different CSI in Sub-Mode 1 of feedback Mode 1-1 depending on whether the CSI to be fed back is for JT or for CB/CS.

Preferably, the CSI feedback unit is configured for feeding back:
CTI, RI and W1; or
CTI, RI and eW1
in the new feedback Type 5 when the CSI to be fed back is for CB/CS.

Preferably, eW1 is obtained by increasing the down-sampled set of W1.

Preferably, the CSI feedback unit is configured for feeding back:
CTI, RI and W1; or
CTI and W1
in the new feedback Type 5 when the CSI to be fed back is for JT.

Preferably, the CSI feedback unit is configured for feeding back:
CTI, RI, W1 and PI(1), PI(1) representing at least a part of information of PI; or
CTI, W1 and PI(1), PI(1) representing at least a part of information of PI
in the new feedback Type 5 when the CSI to be fed back is for JT.

Preferably, the CSI feedback unit is configured for coding PI(1) in a cascaded or joint manner with RI and/or W1 when CTI, RI, W1 and PI(1) is to be fed back in the new feedback Type 5; or the CSI feedback unit is configured for coding PI(1) in a cascaded or joint manner with W1 when CTI, W1 and PI(1) is to be fed back in the new feedback Type 5.

Preferably, the CSI feedback unit is configured for:
feeding back RI and W1 in the feedback Type 5; or
feeding back RI and eW1 in the new feedback Type 5
when the CSI to be fed back is for CB/CS.

Preferably, eW1 is obtained by increasing the down-sampled set of W1.

Preferably, the CSI feedback unit is configured for:
feeding back RI and W1 in the feedback Type 5; or
feeding back W1 in the new feedback Type 5
when the CSI to be fed back is for JT.

Preferably, the CSI feedback unit is configured for feeding back:
RI, W1 and PI(1), PI(1) representing at least a part of information of PI; or
W1 and PI(1), PI(1) representing at least a part of information of PI
in the new feedback Type 5 when the CSI to be fed back is for JT.

Preferably, the CSI feedback unit is configured for coding PI(1) in a cascaded or joint manner with RI and/or W1 when RI, W1 and PI(1) is to be fed back in the new feedback Type 5; or the CSI feedback unit is configured for coding PI(1) in a cascaded or joint manner with W1 when W1 and PI(1) is to be fed back in the new feedback Type 5.

Preferably, the CSI feedback unit is configured for feeding back a wideband W2 and a wideband CQI in a feedback Type 2b when the CSI to be fed back is for CB/CS or for JT.

Preferably, the CSI feedback unit is configured for forming a new feedback Type 2b and feeding back a wideband eW2 and a wideband CQI in the new feedback Type 2b when the CSI to be fed back is for CB/CS.

Preferably, the wideband eW2 is obtained by increasing the number of elements in a value range of the wideband W2.

Preferably, the CSI feedback unit is configured for forming a new feedback Type 2b and feeding back a wideband W2, PI(2) and a wideband CQI in the new feedback Type 2b when the CSI to be fed back is for JT, PI(2) representing at least a part of information of PI.

Preferably, PI(1) and/or PI(2) constitute the complete information of PI.

Preferably, the CSI feedback unit is configured for including the CTI in a feedback Type 3 to form a new feedback Type 3 in Sub-Mode 2 of feedback Mode 1-1, and feeding back different CSI in Sub-Mode 2 of feedback Mode 1-1 depending on whether the CSI to be fed back is for JT or for CB/CS.

Preferably, the CSI feedback unit is configured for feeding back CTI and RI in the new feedback Type 3 when the CSI to be fed back is for CB/CS or for JT.

Preferably, the CSI feedback unit is configured for feeding back:
   CTI, RI and PI(1), PI(1) representing at least a part of information of PI; or
   CTI and PI(1), PI(1) representing at least a part of information of PI
in the new feedback Type 3 when the CSI to be fed back is for JT.

Preferably, the CSI feedback unit is configured for coding PI(1) in a cascaded or joint manner with RI when CTI, RI and PI(1) is to be fed back in the new feedback Type 3.

Preferably, the CSI feedback unit is configured for feeding back RI in the feedback Type 3 when the CSI to be fed back is for CB/CS or for JT.

Preferably, the CSI feedback unit is configured for feeding back:
   RI and PI(1), PI(1) representing at least a part of information of PI; or
   PI(1), PI(1) representing at least a part of information of PI
in the new feedback Type 3 when the CSI to be fed back is for JT.

Preferably, the CSI feedback unit is configured for coding PI(1) in a cascaded or joint manner with RI when RI and PI(1) is to be fed back in the new feedback Type 3.

Preferably, the CSI feedback unit is configured for feeding back a wideband CQI, W1 and a wideband W2 in a feedback Type 2c when the CSI to be fed back is for CB/CS or for JT.

Preferably, the CSI feedback unit is configured for forming a new feedback Type 2c and feeding back a wideband CQI, eW1 and a wideband eW2 in the new feedback Type 2c when the CSI to be fed back is for CB/CS.

Preferably, eW1 is obtained by increasing the down-sampled set of W1 and the wideband eW2 is obtained by increasing the down-sampled set of wideband W2.

Preferably, the CSI feedback unit is configured for forming a new feedback Type 2c and feeding back a wideband CQI, W1, a wideband W2 and PI(2) in the new feedback Type 2c when the CSI to be fed back is for JT, PI(2) representing at least a part of information of PI.

Preferably, PI(1) and/or PI(2) constitute the complete information of PI.

Preferably, the CSI feedback unit is configured for including the CTI in a feedback Type 6 to form a new feedback Type 6 in feedback Mode 2-1, and feeding back different CSI in the feedback Mode 2-1 depending on whether the CSI to be fed back is for JT or for CB/CS.

Preferably, the CSI feedback unit is configured for feeding back CTI, RI and PTI in the new feedback Type 6 when the CSI to be fed back is for CB/CS or for JT.

Preferably, the CSI feedback unit is configured for feeding back:
   CTI, RI, PTI and PI(1), PI(1) representing at least a part of information of PI; or
   CTI, PTI and PI(1), PI(1) representing at least a part of information of PI
in the new feedback Type 6 when the CSI to be fed back is for JT.

Preferably, the CSI feedback unit is configured for coding PI(1) in a cascaded or joint manner with RI when CTI, RI, PTI and PI(1) is to be fed back in the new feedback Type 6.

Preferably, the CSI feedback unit is configured for feeding back RI and PTI in the feedback Type 6 when the CSI to be fed back is for CB/CS or for JT.

Preferably, the CSI feedback unit is configured for feeding back:
   RI, PTI and PI(1), PI(1) representing at least a part of information of PI; or
   PTI and PI(1), PI(1) representing at least a part of information of PI
in the new feedback Type 6 when the CSI to be fed back is for JT.

Preferably, the CSI feedback unit is configured for coding PI(1) in a cascaded or joint manner with RI when RI, PTI and PI(1) is to be fed back in the new feedback Type 6.

Preferably, the CSI feedback unit is configured for feeding back W1 in a feedback Type 2a when the CSI to be fed back is for CB/CS or for JT.

Preferably, the CSI feedback unit is configured for forming a new feedback Type 2a and feeding back a wideband eW1 in the new feedback Type 2a when the CSI to be fed back is for CB/CS.

Preferably, eW1 is obtained by increasing the number of elements in a value range of W1.

Preferably, the CSI feedback unit is configured for forming a new feedback Type 2a and feeding back W1 and PI(2) in the new feedback Type 2a when the CSI to be fed back is for JT, PI(2) representing at least a part of information of PI.

Preferably, the CSI feedback unit is configured for feeding back one preferred sub-band location in a band part and CQI for the sub-band plus a sub-band W2 in a feedback Type 1a when the CSI to be fed back is for CB/CS or for JT.

Preferably, the CSI feedback unit is configured for forming a new feedback Type 1a and feeding back:
   one preferred sub-band location in a band part and CQI for the sub-band plus a sub-band eW2; or
   CQI for a sub-band preferred by the serving BS and a sub-band eW2
in the new feedback Type 1a when the CSI to be fed back is for CB/CS.

Preferably, the sub-band eW2 is obtained by increasing the number of elements in a value range of the sub-band W2.

Preferably, the CSI feedback unit is configured for forming a new feedback Type 1a and feeding back:
   one preferred sub-band location in a band part and CQI for the sub-band plus a sub-band W2 as well as PI(2) representing at least a part of information of PI; or
   CQI for a sub-band preferred by the serving BS plus a sub-band W2 as well as PI(2) representing at least a part of information of PI
in the new feedback Type 1a when the CSI to be fed back is for JT.

Preferably, the CSI feedback unit is configured for differentially coding the sub-band CQI for the non-serving BS and the sub-band CQI for the serving BS.

Preferably, the CSI feedback unit is configured for feeding back a wideband W2 and a wideband CQI in a feedback Type 2b when the CSI to be fed back is for CB/CS or for JT.

Preferably, the CSI feedback unit is configured for forming a new feedback Type 2b and feeding back a wideband eW2 and a wideband CQI in the new feedback Type 2b when the CSI to be fed back is for CB/CS.

Preferably, the wideband eW2 is obtained by increasing the number of elements in a value range of the wideband W2.

Preferably, the CSI feedback unit is configured for forming a new feedback Type 2b and feeding back a wideband W2, PI(3) and a wideband CQI in the new feedback Type 2b when the CSI to be fed back is for JT, PI(3) representing at least a part of information of PI.

Preferably, PI(1) and/or PI(2) and/or P(3) constitute the complete information of PI.

Preferably, the CSI feedback unit is configured for differentially coding the wideband CQI for the non-serving BS and the wideband CQI for the serving BS.

Preferably, the CSI feedback unit is configured for feed back CSI for the serving BS.

Preferably, the coordinated BS determining unit is configured for determining the non-serving BS based on a notification from the serving BS; or the coordinated BS determining unit is configured for determining the non-serving BS autonomously.

According to the second aspect of the present invention, a Channel State Information (CSI) feedback method is provided, which includes the following steps of: determining a set of coordinated Base Stations (BSs) participating in multi-BS coordination, the set of coordinated BSs containing a serving BS and at least one non-serving BS; and feeding back CSI for Joint Transmission (JT) or Coordinated Beamforming/Coordinated Scheduling (CB/CS) for each non-serving BS in the set of coordinated BS.

Preferably, it is indicated whether the fed back CSI is for JT or for CB/CS by using a Coordinated Multi-Point (COMP) Type Indicator (CTI) in the CSI fed back to each non-serving BS.

Preferably, it is determined whether to feed back CSI for JT or for CB/CS based on a system parameter configured by the serving BS in a semi-static manner via high layer signaling or MAC signaling.

Preferably, the CTI is included in a feedback Type 5 to form a new feedback Type 5 in Sub-Mode 1 of feedback Mode 1-1, and different CSI is fed back in Sub-Mode 1 of feedback Mode 1-1 depending on whether the CSI to be fed back is for JT or for CB/CS.

Preferably,

CTI, RI and W1, or

CTI, RI and eW1 are fed back in the new feedback Type 5 when the CSI to be fed back is for CB/CS.

Preferably, eW1 is obtained by increasing the down-sampled set of W1.

Preferably,

CTI, RI and W1; or

CTI and W1 are fed back in the new feedback Type 5 when the CSI to be fed back is for JT.

Preferably,

CTI, RI, W1 and PI(1), PI(1) representing at least a part of information of PI; or CTI, W1 and PI(1), PI(1) representing at least a part of information of PI are fed back in the new feedback Type 5 when the CSI to be fed back is for JT.

Preferably, PI(1) is coded in a cascaded or joint manner with RI and/or W1 when CTI, RI, W1 and PI(1) is to be fed back in the new feedback Type 5; or PI(1) is coded in a cascaded or joint manner with W1 when CTI, W1 and PI(1) is to be fed back in the new feedback Type 5.

Preferably,

RI and W1 are fed back in the feedback Type 5; or

RI and eW1 are fed back in the new feedback Type 5 when the CSI to be fed back is for CB/CS.

Preferably, eW1 is obtained by increasing the down-sampled set of W1.

Preferably,

RI and W1 are fed back in the feedback Type 5; or

W1 is fed back in the new feedback Type 5 when the CSI to be fed back is for JT.

Preferably,

RI, W1 and PI(1), PI(1) representing at least a part of information of PI; or

W1 and PI(1), PI(1) representing at least a part of information of PI are fed back in the new feedback Type 5 when the CSI to be fed back is for JT.

Preferably, PI(1) is coded in a cascaded or joint manner with RI and/or W1 when RI, W1 and PI(1) is to be fed back in the new feedback Type 5; or PI(1) is coded in a cascaded or joint manner with W1 when W1 and PI(1) is to be fed back in the new feedback Type 5.

Preferably, a wideband W2 and a wideband CQI are fed back in a feedback Type 2b when the CSI to be fed back is for CB/CS or for JT.

Preferably, a new feedback Type 2b is formed and a wideband eW2 and a wideband CQI are fed back in the new feedback Type 2b when the CSI to be fed back is for CB/CS.

Preferably, the wideband eW2 is obtained by increasing the number of elements in a value range of the wideband W2.

Preferably, a new feedback Type 2b is formed and a wideband W2, PI(2) and a wideband CQI are fed back in the new feedback Type 2b when the CSI to be fed back is for JT, PI(2) representing at least a part of information of PI.

Preferably, PI(1) and/or PI(2) constitute the complete information of PI.

Preferably, the CTI is included in a feedback Type 3 to form a new feedback Type 3 in Sub-Mode 2 of feedback Mode 1-1, and different CSI is fed back in Sub-Mode 2 of feedback Mode 1-1 depending on whether the CSI to be fed back is for JT or for CB/CS.

Preferably, CTI and RI are fed back in the new feedback Type 3 when the CSI to be fed back is for CB/CS or for JT.

Preferably,

CTI, RI and PI(1), PI(1) representing at least a part of information of PI; or

CTI and PI(1), PI(1) representing at least a part of information of PI are fed back in the new feedback Type 3 when the CSI to be fed back is for JT.

Preferably, coding PI(1) is coded in a cascaded or joint manner with RI when CTI, RI and PI(1) is to be fed back in the new feedback Type 3.

Preferably, RI is fed back in the feedback Type 3 when the CSI to be fed back is for CB/CS or for JT.

Preferably,

RI and PI(1), PI(1) representing at least a part of information of PI; or

PI(1), PI(1) representing at least a part of information of PI is fed back in the new feedback Type 3 when the CSI to be fed back is for JT.

Preferably, PI(1) is coded in a cascaded or joint manner with RI when RI and PI(1) is to be fed back in the new feedback Type 3.

Preferably, a wideband CQI, W1 and a wideband W2 are fed back in a feedback Type 2c when the CSI to be fed back is for CB/CS or for JT.

Preferably, a new feedback Type 2c is formed and a wideband CQI, eW1 and a wideband eW2 are fed back in the new feedback Type 2c when the CSI to be fed back is for CB/CS.

Preferably, eW1 is obtained by increasing the down-sampled set of W1 and the wideband eW2 is obtained by increasing the down-sampled set of wideband W2.

Preferably, a new feedback Type 2c is formed and a wideband CQI, W1, a wideband W2 and PI(2) are fed back in the new feedback Type 2c when the CSI to be fed back is for JT, PI(2) representing at least a part of information of PI.

Preferably, PI(1) and/or PI(2) constitute the complete information of PI.

Preferably, the CTI is included in a feedback Type 6 to form a new feedback Type 6 in feedback Mode 2-1, and different CSI is fed back in the feedback Mode 2-1 depending on whether the CSI to be fed back is for JT or for CB/CS.

Preferably, CTI, RI and PTI are fed back in the new feedback Type 6 when the CSI to be fed back is for CB/CS or for JT.

Preferably,
CTI, RI, PTI and PI(1), PI(1) representing at least a part of information of PI; or
CTI, PTI and PI(1), PI(1) representing at least a part of information of PI
are fed back in the new feedback Type 6 when the CSI to be fed back is for JT.

Preferably, PI(1) is coded in a cascaded or joint manner with RI when CTI, RI, PTI and PI(1) is to be fed back in the new feedback Type 6.

Preferably, RI and PTI are fed back in the feedback Type 6 when the CSI to be fed back is for CB/CS or for JT.

Preferably,
RI, PTI and PI(1), PI(1) representing at least a part of information of
PI; or
PTI and PI(1), PI(1) representing at least a part of information of PI
are fed back in the new feedback Type 6 when the CSI to be fed back is for JT.

Preferably, PI(1) is coded in a cascaded or joint manner with RI when RI, PTI and PI(1) is to be fed back in the new feedback Type 6.

Preferably, W1 is fed back in a feedback Type 2a when the CSI to be fed back is for CB/CS or for JT.

Preferably, a new feedback Type 2a is formed and wideband eW1 is fed back in the new feedback Type 2a when the CSI to be fed back is for CB/CS.

Preferably, eW1 is obtained by increasing the number of elements in a value range of W1.

Preferably, a new feedback Type 2a is formed and W1 and PI(2) are fed back in the new feedback Type 2a when the CSI to be fed back is for JT, PI(2) representing at least a part of information of PI.

Preferably, one preferred sub-band location in a band part and CQI for the sub-band plus a sub-band W2 are fed back in a feedback Type 1a when the CSI to be fed back is for CB/CS or for JT.

Preferably, a new feedback Type 1a is formed and
one preferred sub-band location in a band part and CQI for the sub-band plus a sub-band eW2; or
CQI for a sub-band preferred by the serving BS and a sub-band eW2
are fed back in the new feedback Type 1a when the CSI to be fed back is for CB/CS.

Preferably, the sub-band eW2 is obtained by increasing the number of elements in a value range of the sub-band W2.

Preferably, a new feedback Type 1a is formed and
one preferred sub-band location in a band part and CQI for the sub-band plus a sub-band W2 as well as PI(2) representing at least a part of information of PI; or
CQI for a sub-band preferred by the serving BS plus a sub-band W2 as well as PI(2) representing at least a part of information of PI
are fed back in the new feedback Type 1a when the CSI to be fed back is for JT.

Preferably, the sub-band CQI for the non-serving BS and the sub-band CQI for the serving BS are differentially coded.

Preferably, a wideband W2 and a wideband CQI are fed back in a feedback Type 2b when the CSI to be fed back is for CB/CS or for JT.

Preferably, a new feedback Type 2b is formed and a wideband eW2 and a wideband CQI are fed back in the new feedback Type 2b when the CSI to be fed back is for CB/CS.

Preferably, the wideband eW2 is obtained by increasing the number of elements in a value range of the wideband W2.

Preferably, a new feedback Type 2b is formed and a wideband W2, PI(3) and a wideband CQI are fed back in the new feedback Type 2b when the CSI to be fed back is for JT, PI(3) representing at least a part of information of PI.

Preferably, PI(1) and/or PI(2) and/or P(3) constitute the complete information of PI.

Preferably, the wideband CQI for the non-serving BS and the wideband CQI for the serving BS are differentially coded.

Preferably, the CSI feedback method of the present invention further includes feeding back CSI for the serving BS.

Preferably, the non-serving BS is notified from the serving BS to the UE; or the non-serving BS is determined autonomously by the UE.

The CSI feedback method in the multi-BS coordination mode and the UE according to the present invention have the advantages of dynamic support for JT and CB/CS transmissions, simple implementation and low signaling overhead. In addition, the serving BS can configure the UE to employ JT or CB/CS via high layer signaling (e.g., Radio Resource Control (RRC) signaling) or MAC layer signaling in a semi-static manner. The serving BS can flexibly select the coordinated BS communication scheme based on background connection condition and/or load condition and/or quality condition of user service.

BRIEF DESCRIPTION OF DRAWINGS

The above and other objects, features and advantages of the present invention will be more apparent from the following preferred embodiments illustrated with reference to the figures, in which.

DESCRIPTION OF EMBODIMENTS

Preferred embodiments of the present invention will be detailed with reference to the drawings. In the following description, details and functions unnecessary to the present invention are omitted so as not to obscure the concept of the invention.

For clear and detailed explanation of the implementation steps of the present invention, some specific examples applicable to the LTE-A cellular communication system are given below. Herein, it is to be noted that the present invention is not limited to the application exemplified in the embodiments. Rather, it is applicable to other communication systems, such as the future 5G system.

Figure 1:
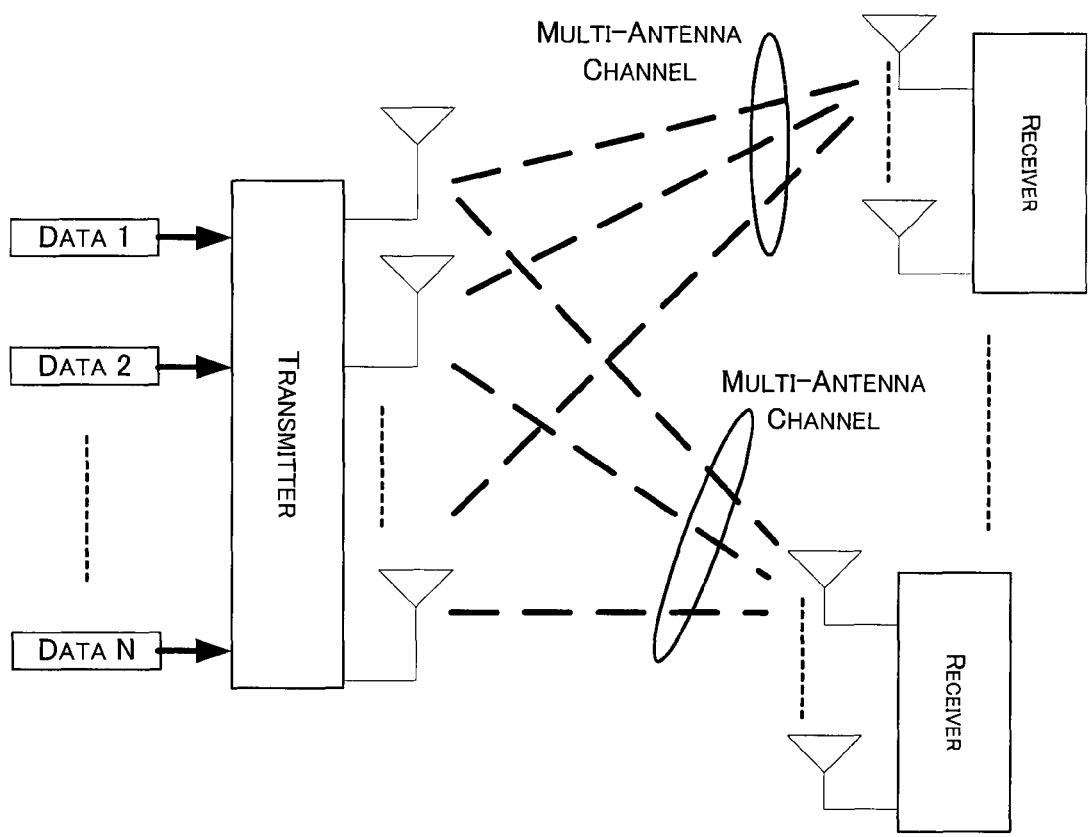
FIG. 1 is a schematic diagram of a MIMO system.
Figure 2:
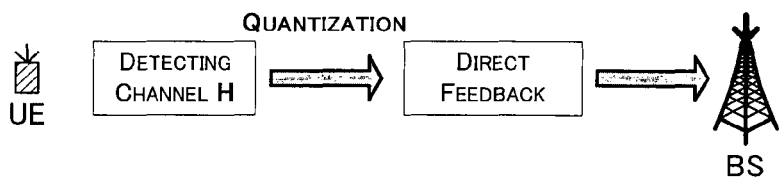
FIG. 2 is a schematic diagram of complete CSI feedback.
Figure 3:
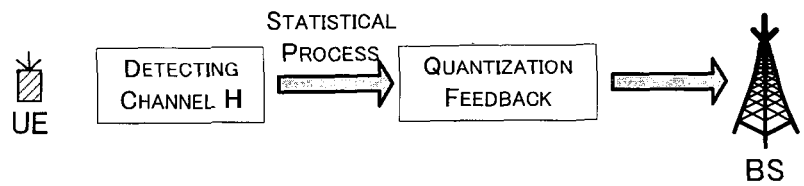
FIG. 3 is a schematic diagram of statistic-based CSI feedback.
Figure 4:
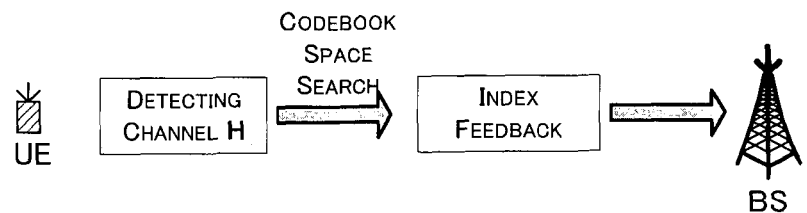
FIG. 4 is a schematic diagram of CSI feedback based on codebook space search.
Figure 5:
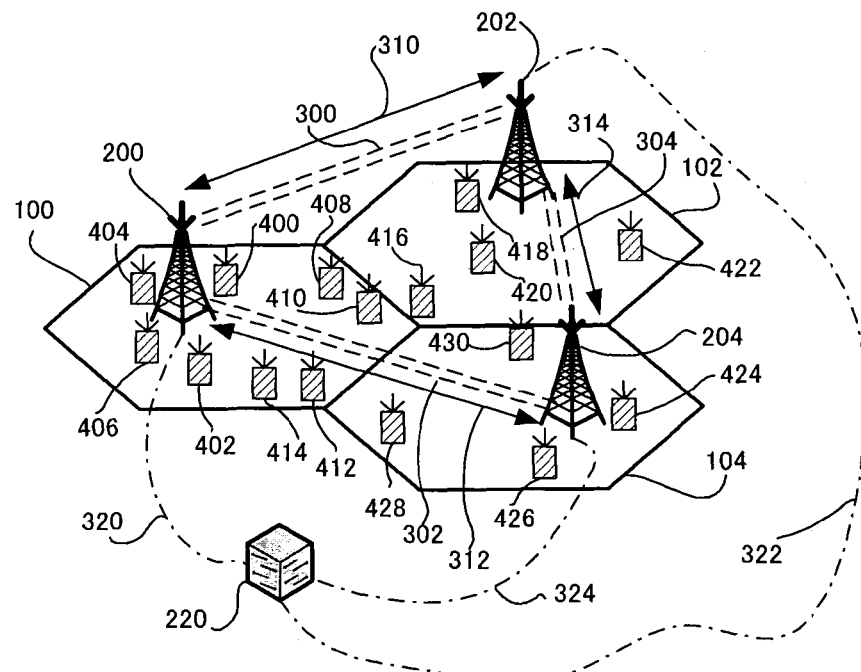
FIG. 5 is a schematic diagram of a multi-cell cellular communication system.

FIG. 5 is a schematic diagram of a multi-cell cellular communication system. The cellular system divides a service coverage area into a number of adjacent wireless coverage areas, i.e., cells. In FIG. 5, the entire service area is formed by cells 100, 102 and 104, each being illustratively shown as a hexagon. Base Stations (BSs) 200, 202 and 204 are associated with the cells 100, 102 and 104, respectively. As known to those skilled in the art, each of the BSs 200-204 includes at least a transmitter and a receiver. Herein, it is to be noted that a BS, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 5, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 5 is illustrative only and does not imply that the implementation of the cellular system according to the present invention is limited to the above particular constraints.

As shown in FIG. 5, the BSs 200-204 are connected with each other via X2 interfaces 300, 302 and 304. In a LTE-A system, a three-layer node network architecture including base station, radio network control unit and core network is simplified into a two-layer node architecture in which the function of the radio network control unit is assigned to the base station and a wired interface named "X2" is defined for coordination and communication between base stations.

In FIG. 5, the BSs 200-204 are also connected with each other via air interfaces, A1 interfaces, 310, 312 and 314. In a future communication system, it is possible to introduce a concept of relay node. Relay nodes are connected with each other via wireless interfaces and a base station can be considered as a special relay node. Thus, a wireless interface named "A1" can then be used for coordination and communication between base stations.

Additionally, an high layer entity 220 of the BSs 200-204 is also shown in FIG. 5, which can be a gateway or another network entity such as mobility management entity. The high layer entity 220 is connected to the BSs 200-204 via S1 interfaces 320, 322 and 324, respectively. In a LTE system, a wired interface named "S1" is defined for coordination and communication between the high layer entity and the base station.

A number of User Equipments (UEs) 400-430 are distributed over the cells 100-104, as shown in FIG. 5. As known to those skilled in the art, each of the UEs 400-430 includes a transmitter, a receiver and a mobile terminal control unit. Each of the UEs 400-430 can access the cellular communication system via its serving BS (one of the BSs 200-204). It should be understood that while only 16 UEs are illustratively shown in FIG. 5, there may be a large number of UEs in practice. In this sense, the description of the UEs in FIG. 5 is also for illustrative purpose only. Each of the UEs 400-430 can access the cellular communication network via its serving BS. The BS directly providing communication service to a certain UE is referred to as the serving BS of that UE, while other BSs are referred to non-serving BSs of that UE. The non-serving BSs can function as coordinated BSs of the serving BS and provide communication service to the UE along with the serving BS.

For explanation of this embodiment, the UE 416 is considered. The UE 416 operates in a multi-BS coordination mode, has BS 202 as its serving BS and has BSs 200 and 204 as its coordinated BSs. It is to be noted that this embodiment focuses on the UE 416, which does not imply that the present invention is only applicable to one UE scenario. Rather, the present invention is fully applicable to multi-UE scenario. For example, the inventive method can be applied to the UEs 408, 410, 430 and the like as shown in FIG. 5. In an exemplary scenario, there is one serving BS and two coordinated BSs. However, the present invention is not limited to this. In fact, the present invention is not limited to any specific number of serving BS(s) or coordinated BS(s).

Figure 6:
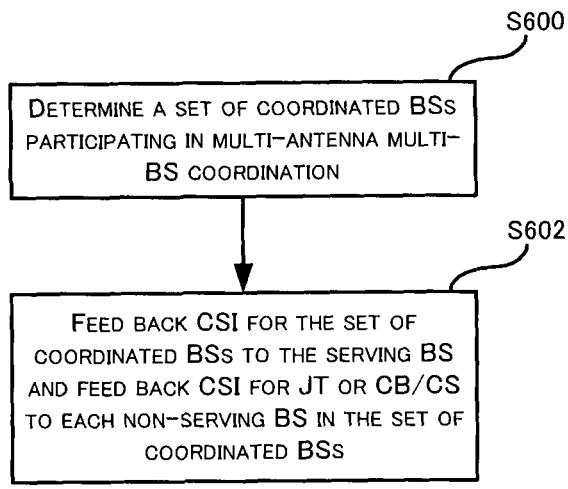
FIG. 6 is a flowchart illustrating the CSI feedback method according to the present invention.

FIG. 6 is a flowchart of the present invention. The process of the present invention will be explained with reference to FIG. 6. In description of the embodiments, the following scenario of multi-BS coordination is assumed.

Exemplary Scenario:

The UE 416, as an example only, operates in a multi-BS coordination mode, has BS 202 as its serving BS, and has BSs 200 and 204 as its coordinated BSs (non-serving BSs). The UE 416 can be a single antenna or multi-antenna device. Also, a serving BS and at least one non-serving BS can be given to any other UE (such as any one of UEs 400-430) capable of operating in the multi-BS coordination mode.

At step S600, a set of coordinated BSs participating in multi-antenna multi-BS coordination is determined.

In an embodiment, the UE (e.g., UE 416) can periodically report to the serving BS (e.g., the serving BS 202) path loss information from the UE to its adjacent BSs. Accordingly, the serving BS can estimate the geographic location of the UE from the report, then determine the non-serving BSs participating in the multi-BS coordination for the UE (e.g., BSs 200 and 204) and notify the UE of the non-serving BSs. The UE can obtain the set of coordinated BSs based on the serving BS and the notified non-serving BSs. Alternatively, the UE can autonomously determine the non-serving BSs participating in the multi-BS coordination for the UE from the measured path loss information, thereby determining the set of coordinated BSs.

At step S602, according to the feedback design of the current system, CSI for the set of coordinated BSs is fed back to the serving BS. Here, CSI for Joint Transmission (JT) or Coordinated Beamforming/Coordinated Scheduling (CB/CS) for each non-serving BS in the set of coordinated BS is fed back.

It is possible to dynamically indicate whether the fed back CSI is for JT or for CB/CS by using a 1-bit CoMP Type Indicator (CTI) contained in the feedback information. Alternatively, the serving BS can configure the UE as to whether to feed back CSI for JT or for CB/CS in a semi-static manner via high layer signaling or MAC signaling.

In the following, three specific examples will be given to illustrate the CSI feedback operation for each BS in the set of coordinated BSs.

Example 1

The serving BS 202 configures the feedback mode of the UE 416 to be Sub-Mode 1 of Mode 1-1. The feedback for the serving BS 202 remains the same as the feedback design of the current system.

Regarding the feedback for the coordinated BSs 200 and 204, the UE 416 includes a 1-bit CoMP Type Indicator (CTI) for dynamically indicating whether the fed back CSI is for JT or for CB/CS. In particular, for Sub-Mode 1 of Mode 1-1 (which is a combination of feedback Type 5 and feedback Type 2b and is configured by the serving BS 202):

The CTI is included in the feedback Type 5 to form a new feedback Type 5. Different information (RI, W1, eW1, PI and combination thereof) is fed back depending on the different purposes (JT or CB/CS) of CSI feedback.

Assuming that CTI=0 indicates a CSI feedback for CB/CS, the UE 416 can feed back in the new feedback Type 5:
CTI=0, RI and W1; or
CTI=0, RI and eW1 (eW1 can be obtained by increasing the down-sampled set of W1).

Assuming that CTI=1 indicates a CSI feedback for JT, the UE 416 can feed back in the new feedback Type 5:
CTI=1, RI and W1; or
CTI=1 and W1; or
CTI=1, RI, W1 and PI(1) (PI(1) represents at least a part of information of PI and can be coded in a cascaded or joint manner with RI and/or W1); or
CTI=1, W1 and PI(1) (PI(1) represents at least a part of information of PI and can be coded in a cascaded or joint manner with W1).

Independent of the specific indication of CTI, the UE 416 can feed back another feedback Type 2b which should be fed back in Sub-Mode 1 of Mode 1-1, i.e., a wideband W2 an a wideband CQI, according to the current specification.

Alternatively, the UE 416 can adjust another feedback Type 2b which should be fed back in Sub-Mode 1 of Mode 1-1 to form a new feedback Type 2b:
Assuming that CTI=0 indicates a CSI feedback for CB/CS, the UE 416 can feed back in the new feedback Type 2b:
a wideband eW2 and a wideband CQI (wideband eW2 can be obtained by increasing the number of elements in a value range of wideband W2).

In addition, the wideband CQI for the non-serving BS and the wideband CQI for the serving BS 202 can be differentially coded in order to control feedback overhead.

Assuming that CTI=1 indicates a CSI feedback for JT, the UE 416 can feed back in the new feedback Type 2b:
a wideband W2, PI(2) and a wideband CQI (PI(2) represents at least a part of information of PI).

In addition, the wideband CQI for the non-serving BS and the wideband CQI for the serving BS 202 can be differentially coded in order to control feedback overhead.

It is to be noted that PI(1) and/or PI(2) should constitute the complete information of PI.

Further, the existing feedback Type 2b can be combined with the above new feedback Type 2b. For example, when CTI=0 (for CB/CS), the UE 416 feeds back information in the existing feedback Type 2b (wideband W2 and wideband CQI); when CTI=1 (for JT), the UE 416 feeds back information in the new feedback Type 2b (wideband W2, PI(2) and wideband CQI). Alternatively, when CTI=1 (for JT), the UE 416 feeds back information in the existing feedback Type 2b (wideband W2 and wideband CQI); when CTI=0 (for CB/CS), the UE 416 feeds back information in the new feedback Type 2b (wideband eW2 and wideband CQI).

It is to be noted that the value assumption of CTI is an example only for illustration of the embodiment. In practice, an inversed setting can be employed, i.e., CTI=1 indicates the CSI feedback for CB/CS while CTI=0 indicates the CSI feedback for JT.

Example 1'

The serving BS 202 configures the feedback mode of the UE 416 to be Sub-Mode 1 of Mode 1-1. The feedback for the serving BS 202 remains the same as the feedback design of the current system.

Regarding the feedback for the coordinated BSs 200 and 204, for Sub-Mode 1 of Mode 1-1 (which is a combination of feedback Type 5 and feedback Type 2b and is configured by the serving BS 202):
Different information (RI, W1, eW1, PI and combination thereof) is fed back depending on the different purposes (JT or CB/CS) of CSI feedback.

If the serving BS 202 configures the UE 416 to use CB/CS in a semi-static manner via high layer signaling (e.g., Radio Resource Control (RRC) signaling) or MAC layer signaling, the UE 416 can feed back:
RI and W1 in the feedback Type 5; or
RI and eW1 in the new feedback Type 5 (eW1 can be obtained by increasing the down-sampled set of W1).

If the serving BS 202 configures the UE 416 to use JT in a semi-static manner via high layer signaling (e.g., RRC signaling) or MAC layer signaling, the UE 416 can feed back:
RI and W1 in the feedback Type 5; or
W1 in the new feedback Type 5; or
RI, W1 and PI(1) in the new feedback Type 5 (PI(1) represents at least a part of information of PI and can be coded in a cascaded or joint manner with RI and/or W1); or
W1 and PI(1) in the new feedback Type 5 (PI(1) represents at least a part of information of PI and can be coded in a cascaded or joint manner with W1).

The UE 416 can feed back another feedback Type 2b which should be fed back in Sub-Mode 1 of Mode 1-1, i.e., a wideband W2 an a wideband CQI, according to the current specification.

Alternatively, the UE 416 can adjust another feedback Type 2b which should be fed back in Sub-Mode 1 of Mode 1-1 to form a new feedback Type 2b:
If the serving BS 202 configures the UE 416 to use CB/CS in a semi-static manner via high layer signaling (e.g., RRC signaling) or MAC layer signaling, the UE 416 can feed back in the new feedback Type 2b:
a wideband eW2 and a wideband CQI (wideband eW2 can be obtained by increasing the number of elements in a value range of wideband W2).

In addition, the wideband CQI for the non-serving BS and the wideband CQI for the serving BS 202 can be differentially coded in order to control feedback overhead.

If the serving BS 202 configures the UE 416 to use JT in a semi-static manner via high layer signaling (e.g., RRC signaling) or MAC layer signaling, the UE 416 can feed back in the new feedback Type 2b:
a wideband W2, PI(2) and a wideband CQI (PI(2) represents at least a part of information of PI).

In addition, the wideband CQI for the non-serving BS and the wideband CQI for the serving BS 202 can be differentially coded in order to control feedback overhead.

It is to be noted that PI(1) and/or PI(2) should constitute the complete information of PI.

Further, the existing feedback Type 2b can be combined with the above new feedback Type 2b. For example, when the serving BS 202 configures the UE 416 to use CB/CS in a semi-static manner via high layer signaling (e.g., RRC signaling) or MAC layer signaling, the UE 416 feeds back information in the existing feedback Type 2b (wideband W2 and wideband CQI); when the serving BS 202 configures the UE 416 to use JT in a semi-static manner via high layer signaling (e.g., RRC signaling) or MAC layer signaling, the UE 416 feeds back information in the new feedback Type 2b (wideband W2, PI(2) and wideband CQI). Alternatively, when the serving BS 202 configures the UE 416 to use JT in a semi-static manner via high layer signaling (e.g., RRC signaling) or MAC layer signaling, the UE 416 feeds back information in the existing feedback Type 2b (wideband W2 and wideband CQI); when the serving BS 202 configures the UE 416 to use CB/CS in a semi-static manner via high layer signaling (e.g., RRC signaling) or MAC layer signaling, the UE 416 feeds back information in the new feedback Type 2b (wideband eW2 and wideband CQI).

Example 2

The serving BS 202 configures the feedback mode of the UE 416 to be Sub-Mode 2 of Mode 1-1. The feedback for the serving BS 202 remains the same as the feedback design of the current system.

Regarding the feedback for the coordinated BSs 200 and 204, the UE 416 includes a 1-bit CoMP Type Indicator (CTI) for dynamically indicating whether the fed back CSI is for JT or for CB/CS. In particular, for Sub-Mode 2 of Mode 1-1 (which is a combination of feedback Type 3 and feedback Type 2/2c and is configured by the serving BS 202):

The CTI is included in the feedback Type 3 to form a new feedback Type 3. Different information (RI, PI and combination thereof) is fed back depending on the different purposes (JT or CB/CS) of CSI feedback.

Assuming that CTI=0 indicates a CSI feedback for CB/CS, the UE 416 can feed back CTI=0 and RI in the new feedback Type 3.

Assuming that CTI=1 indicates a CSI feedback for JT, the UE 416 can feed back in the new feedback Type 3:
CTI=0 and RI; or
CTI=0, RI and PI(1) (PI(1) represents at least a part of information of PI and can be coded in a cascaded or joint manner with RI); or
CTI=0 and PI(1) (PI(1) represents at least a part of information of PI).

Independent of the specific indication of CTI, the UE 416 can feed back another feedback Type 2c which should be fed back in Sub-Mode 2 of Mode 1-1, i.e., a wideband CQI, W1 an a wideband W2, according to the current specification.

Alternatively, the UE 416 can adjust another feedback Type 2c which should be fed back in Sub-Mode 2 of Mode 1-1 to form a new feedback Type 2c:
Assuming that CTI=0 indicates a CSI feedback for CB/CS, the UE 416 can feed back in the new feedback Type 2c:
a wideband CQI, eW1 and a wideband eW2 (eW1 and wideband eW2 can be obtained by increasing the value ranges of W1 and wideband W2, respectively).

In addition, the wideband CQI for the non-serving BS and the wideband CQI for the serving BS 202 can be differentially coded in order to control feedback overhead.

Assuming that CTI=1 indicates a CSI feedback for JT, the UE 416 can feed back in the new feedback Type 2c:
a wideband CQI, W1, a wideband W2 and PI(2) (PI(2) represents at least a part of information of PI).

In addition, the wideband CQI for the non-serving BS and the wideband CQI for the serving BS 202 can be differentially coded in order to control feedback overhead.

It is to be noted that PI(1) and/or PI(2) should constitute the complete information of PI.

Further, the existing feedback Type 2c can be combined with the above new feedback Type 2c. For example, when CTI=0 (for CB/CS), the UE 416 feeds back information in the existing feedback Type 2c (wideband CQI, W1 and wideband W2); when CTI=1 (for JT), the UE 416 feeds back information in the new feedback Type 2c (wideband CQI, W1, wideband W2 and PI(2)). Alternatively, when CTI=1 (for JT), the UE 416 feeds back information in the existing feedback Type 2c (wideband CQI, W1 and wideband W2); when CTI=0 (for CB/CS), the UE 416 feeds back information in the new feedback Type 2c (wideband CQI, eW1, and wideband eW2).

It is to be noted that the value assumption of CTI is an example only for illustration of the embodiment. In practice, an inversed setting can be employed, i.e., CTI=1 indicates the CSI feedback for CB/CS while CTI=0 indicates the CSI feedback for JT.

Example 2'

The serving BS 202 configures the feedback mode of the UE 416 to be Sub-Mode 2 of Mode 1-1. The feedback for the serving BS 202 remains the same as the feedback design of the current system.

Regarding the feedback for the coordinated BSs 200 and 204, for Sub-Mode 2 of Mode 1-1 (which is a combination of feedback Type 3 and feedback Type 2/2c and is configured by the serving BS 202):

Different information (RI, PI and combination thereof) is fed back depending on the different purposes (JT or CB/CS) of CSI feedback.

If the serving BS 202 configures the UE 416 to use CB/CS in a semi-static manner via high layer signaling (e.g., RRC signaling) or MAC layer signaling, the UE 416 can feed back RI in the new feedback Type 3.

If the serving BS 202 configures the UE 416 to use JT in a semi-static manner via high layer signaling (e.g., RRC signaling) or MAC layer signaling, the UE 416 can feed back:
RI in the feedback Type 3; or
RI and PI(1) in the new feedback Type 3 (PI(1) represents at least a part of information of PI and can be coded in a cascaded or joint manner with RI); or
PI(1) in the new feedback Type 3 (PI(1) represents at least a part of information of PI).

Independent of the specific indication of CTI, the UE 416 can feed back another feedback Type 2c which should be fed back in Sub-Mode 2 of Mode 1-1, i.e., a wideband CQI, W1 an a wideband W2, according to the current specification.

Alternatively, the UE 416 can adjust another feedback Type 2c which should be fed back in Sub-Mode 2 of Mode 1-1 to form a new feedback Type 2c:
If the serving BS 202 configures the UE 416 to use CB/CS in a semi-static manner via high layer signaling (e.g., RRC signaling) or MAC layer signaling, the UE 416 can feed back in the new feedback Type 2c:
   a wideband CQI, eW1 and a wideband eW2 (eW1 and eW2 can be obtained by increasing the value ranges of W1 and the wideband W2, respectively).

In addition, the wideband CQI for the non-serving BS and the wideband CQI for the serving BS 202 can be differentially coded in order to control feedback overhead.

If the serving BS 202 configures the UE 416 to use JT in a semi-static manner via high layer signaling (e.g., RRC signaling) or MAC layer signaling, the UE 416 can feed back in the new feedback Type 2c:
   a wideband CQI, W1, a wideband W2 and PI(2) (PI(2) represents at least a part of information of PI).

In addition, the wideband CQI for the non-serving BS and the wideband CQI for the serving BS 202 can be differentially coded in order to control feedback overhead.

It is to be noted that PI(1) and/or PI(2) should constitute the complete information of PI.

Further, the existing feedback Type 2c can be combined with the above new feedback Type 2c. For example, when the serving BS 202 configures the UE 416 to use CB/CS in a semi-static manner via high layer signaling (e.g., RRC signaling) or MAC layer signaling, the UE 416 feeds back information in the existing feedback Type 2c (wideband CQI, W1 and wideband W2); when the serving BS 202 configures the UE 416 to use JT in a semi-static manner via high layer signaling (e.g., RRC signaling) or MAC layer signaling, the UE 416 feeds back information in the new feedback Type 2c (wideband CQI, W1, wideband W2 and PI(2)). Alternatively, when the serving BS 202 configures the UE 416 to use JT in a semi-static manner via high layer signaling (e.g., RRC signaling) or MAC layer signaling, the UE 416 feeds back information in the existing feedback Type 2c (wideband CQI, W1 and wideband W2); when the serving BS 202 configures the UE 416 to use CB/CS in a semi-static manner via high layer signaling (e.g., RRC signaling) or MAC layer signaling, the UE 416 feeds back information in the new feedback Type 2c (wideband CQI, eW1, and wideband eW2).

Example 3

The serving BS 202 configures the feedback mode of the UE 416 to be a new Mode 2-1. The feedback for the serving BS 202 remains the same as the feedback design of the current system.

Regarding the feedback for the coordinated BSs 200 and 204, the UE 416 includes a 1-bit CoMP Type Indicator (CTI) for dynamically indicating whether the fed back CSI is for JT or for CB/CS. In particular, for the new Mode 2-1 (which is a combination of feedback Type 6, feedback Type 2b and feedback Type 2a/1a and is configured by the serving BS 202):
   The CTI is included in the feedback Type 6 to form a new feedback Type 3. Different information (RI, PI and combination thereof) is fed back depending on the different purposes (JT or CB/CS) of CSI feedback.
   Assuming that CTI=0 indicates a CSI feedback for CB/CS, the UE 416 can feed back CTI=0 and RI in the new feedback Type 6:
      CTI=0, RI and PTI.
   Assuming that CTI=1 indicates a CSI feedback for JT, the UE 416 can feed back in the new feedback Type 6:
      CTI=1, RI and PTI; or
      CTI=1, RI, PTI and PI(1) (PI(1) represents at least a part of information of PI and can be coded in a cascaded or joint manner with RI); or
      CTI=1, PTI and PI(1) (PI(1) represents at least a part of information of PI).

Independent of the specific indication of CTI, the UE 416 can feed back other feedback Types 2b and 2a/1a which should be fed back in the new Mode 2-1 according to the current specification. That is, when PTI=0, Type 2b (wideband W2 and wideband CQI) and Type 2a (W1) are fed back; when PTI=1, Type 2b (wideband W2 and wideband CQI) and Type 1a (one preferred sub-band location in a band part, CQI for the sub-band plus a sub-band W2) are fed back.

Alternatively, the UE 416 can adjust the other feedback Types 2b and 2a/1a which should be fed back in the new Mode 2-1 to form a new feedback Type 2b, a new feedback Type 2a and a new feedback Type 1a. For different values of PTI in the feedback Type 6, there are different components in the new Mode 2-1 and a number of possible adjustments for the new feedback Types 2b/2a/1a. Thus, the following description will be given in two separate cases: PTI=0 and PTI=1.

(1) In the case where PTI=0, the new feedback Types 2a and 2b will be discussed.

For the new feedback Type 2a:
   Assuming that CTI=0 indicates a CSI feedback for CB/CS, the UE 416 can feed back in the new feedback Type 2a.
      eW1 (eW1 can be obtained by increasing the number of elements in the value range of W1).
   Assuming that CTI=1 indicates a CSI feedback for JT, the UE 416 can feed back in the new feedback Type 2a.
      W1 and PI(2) (PI(2) represents at least a part of information of PI).

For the new feedback Type 2b:
   Assuming that CTI=0 indicates a CSI feedback for CB/CS, the UE 416 can feed back in the new feedback Type 2b:
      a wideband eW2 and a wideband CQI (wideband eW2 can be obtained by increasing the number of elements in the value range of wideband W2).

In addition, the wideband CQI for the non-serving BS and the wideband CQI for the serving BS 202 can be differentially coded in order to control feedback overhead.
   Assuming that CTI=1 indicates a CSI feedback for JT, the UE 416 can feed back in the new feedback Type 2b:
      a wideband W2, PI(3) and a wideband CQI (PI(3) represents at least a part of information of PI).

In addition, the wideband CQI for the non-serving BS and the wideband CQI for the serving BS 202 can be differentially coded in order to control feedback overhead.

It is to be noted that PI(1) and/or PI(2) and/or PI(3) should constitute the complete information of PI.

Further, the existing feedback Types 2a/2b can be combined with the above new feedback Types 2a/2b. For example, when CTI=0 (for CB/CS), the UE 416 feeds back information in the existing feedback Types 2a and 2b (W1, wideband W2 and wideband CQI); when CTI=1 (for JT), the UE 416 feeds back information in the new feedback Types 2a and 2b (W1, wideband W2, PI(2), PI(3) and wideband CQI). Alternatively, when CTI=1 (for JT), the UE 416 feeds back information in the existing feedback Types 2a and 2b (W1, wideband W2 and wideband CQI); when CTI=0 (for CB/CS), the UE 416 feeds back information in the new feedback Types 2a and 2b (eW1, wideband eW2 and wideband CQI). Of course, other combinations are encompassed by the present invention.

It is to be noted that the value assumption of CTI is an example only for illustration of the embodiment. In practice, an inversed setting can be employed, i.e., CTI=1 indicates the CSI feedback for CB/CS while CTI=0 indicates the CSI feedback for JT.

(2) In the case where PTI=1, the new feedback Types 2b and 1a will be discussed.

For the new feedback Type 1a:
Assuming that CTI=0 indicates a CSI feedback for CB/CS, the UE 416 can feed back in the new feedback Type 1a:
one preferred sub-band location in a band part, CQI for the sub-band plus a sub-band eW2 (the sub-band eW2 can be obtained by increasing the number of elements in the value range of sub-band W2); or
CQI for a sub-band preferred by the serving BS and a sub-band eW2 (the sub-band eW2 can be obtained by increasing the number of elements in the value range of sub-band W2).

In addition, the wideband CQI for the non-serving BS and the wideband CQI for the serving BS 202 can be differentially coded in order to control feedback overhead.

Assuming that CTI=1 indicates a CSI feedback for JT, the UE 416 can feed back in the new feedback Type 1a:
one preferred sub-band location in a band part, CQI for the sub-band plus a sub-band W2 and PI(2) (PI(2) represents at least a part of information of PI); or
CQI for a sub-band preferred by the serving BS plus a sub-band W2 and PI(2) (PI(2) represents at least a part of information of PI).

In addition, the wideband CQI for the non-serving BS and the wideband CQI for the serving BS 202 can be differentially coded in order to control feedback overhead.

For the new feedback Type 2b:
Assuming that CTI=0 indicates a CSI feedback for CB/CS, the UE 416 can feed back in the new feedback Type 2b:
a wideband eW2 and a wideband CQI (wideband eW2 can be obtained by increasing the number of elements in the value range of wideband W2).

In addition, the wideband CQI for the non-serving BS and the wideband CQI for the serving BS 202 can be differentially coded in order to control feedback overhead.

Assuming that CTI=1 indicates a CSI feedback for JT, the UE 416 can feed back in the new feedback Type 2b:
a wideband W2, PI(3) and a wideband CQI (PI(3) represents at least a part of information of PI).

In addition, the wideband CQI for the non-serving BS and the wideband CQI for the serving BS 202 can be differentially coded in order to control feedback overhead.

It is to be noted that PI(1) and/or PI(2) and/or PI(3) should constitute the complete information of PI.

Further, the existing feedback Types 1a/2b can be combined with the above new feedback Types 1a/2b. For example, when CTI=0 (for CB/CS), the UE 416 feeds back information in the existing feedback Types 1a and 2b (one preferred sub-band location in a band part, CQI for the sub-band plus a sub-band W2, a wideband W2 and a wideband CQI); when CTI=1 (for JT), the UE 416 feeds back information in the new feedback Types 1a and 2b (one preferred sub-band location in a band part, CQI for the sub-band plus a sub-band W2, a wideband W2, a wideband CQI, PI(2) and PI(3)). Alternatively, when CTI=1 (for JT), the UE 416 feeds back information in the existing feedback Types 1a and 2b (one preferred sub-band location in a band part, CQI for the sub-band plus a sub-band W2, a wideband W2 and a wideband CQI); when CTI=0 (for CB/CS), the UE 416 feeds back information in the new feedback Types 1a and 2b (CQI for a sub-band preferred by the serving BS, a sub-band eW2, a wideband eW2 and a wideband CQI). Of course, other combinations are encompassed by the present invention.

It is to be noted that the value assumption of CTI is an example only for illustration of the embodiment. In practice, an inversed setting can be employed, i.e., CTI=1 indicates the CSI feedback for CB/CS while CTI=0 indicates the CSI feedback for JT.

Example 3'

The serving BS 202 configures the feedback mode of the UE 416 to be a new Mode 2-1. The feedback for the serving BS 202 remains the same as the feedback design of the current system.

Regarding the feedback for the coordinated BSs 200 and 204, the UE 416 includes a 1-bit CoMP Type Indicator (CTI) for dynamically indicating whether the fed back CSI is for JT or for CB/CS. In particular, for the new Mode 2-1 (which is a combination of feedback Type 6, feedback Type 2b and feedback Type 2a/1a and is configured by the serving BS 202):
Different information (RI, PTI, PI and combination thereof) is fed back depending on the different purposes (JT or CB/CS) of CSI feedback.
If the serving BS 202 configures the UE 416 to use CB/CS in a semi-static manner via high layer signaling (e.g., RRC signaling) or MAC layer signaling, the UE 416 can feed back RI and PTI in the new feedback Type 6.
If the serving BS 202 configures the UE 416 to use JT in a semi-static manner via high layer signaling (e.g., RRC signaling) or MAC layer signaling, the UE 416 can feed back: RI and PTI in the feedback Type 6; or RI, PTI and PI(1) in the new feedback Type 6 (PI(1) represents at least a part of information of PI and can be coded in a cascaded or joint manner with RI); or PTI and PI(1) in the new feedback Type 6 (PI(1) represents at least a part of information of PI).

Independent of the specific indication of CTI, the UE 416 can feed back other feedback Types 2b and 2a/1a which should be fed back in the new Mode 2-1 according to the current specification. That is, when PTI=0, Type 2b and Type 2a (W1, wideband W2 and wideband CQI) are fed back; when PTI=1, Type 2b and Type 1a (one preferred sub-band location in a band part, CQI for the sub-band plus a sub-band W2, a wideband W2 and a wideband CQI) are fed back.

Alternatively, the UE 416 can adjust the other feedback Types 2b and 2a/1a which should be fed back in the new Mode 2-1 to form a new feedback Type 2b, a new feedback Type 2a and a new feedback Type 1a. For different values of PTI in the feedback Type 6, there are different components in the new Mode 2-1 and a number of possible adjustments for the new feedback Types 2b/2a/1a. Thus, the following description will be given in two separate cases: PTI=0 and PTI=1.

(1) In the case where PTI=0, the new feedback Types 2a and 2b will be discussed.

For the new feedback Type 2a:
If the serving BS 202 configures the UE 416 to use CB/CS in a semi-static manner via high layer signaling (e.g., RRC signaling) or MAC layer signaling, the UE 416 can feed back in the new feedback Type 2a:
eW1 (eW1 can be obtained by increasing the number of elements in the value range of W1).

If the serving BS 202 configures the UE 416 to use JT in a semi-static manner via high layer signaling (e.g., RRC signaling) or MAC layer signaling, the UE 416 can feed back in the new feedback Type 2a:

W1 and PI(2) (PI(2) represents at least a part of information of PI).

For the new feedback Type 2b:

If the serving BS 202 configures the UE 416 to use CB/CS in a semi-static manner via high layer signaling (e.g., RRC signaling) or MAC layer signaling, the UE 416 can feed back in the new feedback Type 2b:

a wideband eW2 and a wideband CQI (wideband eW2 can be obtained by increasing the number of elements in the value range of wideband W2).

In addition, the wideband CQI for the non-serving BS and the wideband CQI for the serving BS 202 can be differentially coded in order to control feedback overhead.

If the serving BS 202 configures the UE 416 to use JT in a semi-static manner via high layer signaling (e.g., RRC signaling) or MAC layer signaling, the UE 416 can feed back in the new feedback Type 2b:

a wideband W2, PI(3) and a wideband CQI (PI(3) represents at least a part of information of PI).

In addition, the wideband CQI for the non-serving BS and the wideband CQI for the serving BS 202 can be differentially coded in order to control feedback overhead.

It is to be noted that PI(1) and/or PI(2) and/or PI(3) should constitute the complete information of PI.

Further, the existing feedback Types 2a/2b can be combined with the above new feedback Types 2a/2b. For example, when the serving BS 202 configures the UE 416 to use CB/CS in a semi-static manner via high layer signaling (e.g., RRC signaling) or MAC layer signaling, the UE 416 feeds back information in the existing feedback Types 2a and 2b (W1, wideband W2 and wideband CQI); when the serving BS 202 configures the UE 416 to use JT in a semi-static manner via high layer signaling (e.g., RRC signaling) or MAC layer signaling, the UE 416 feeds back information in the new feedback Types 2a and 2b (W1, wideband W2, PI(2) PI(3) and wideband CQI). Alternatively, when the serving BS 202 configures the UE 416 to use JT in a semi-static manner via high layer signaling (e.g., RRC signaling) or MAC layer signaling, the UE 416 feeds back information in the existing feedback Types 2a and 2b (W1, wideband W2 and wideband CQI); when the serving BS 202 configures the UE 416 to use CB/CS in a semi-static manner via high layer signaling (e.g., RRC signaling) or MAC layer signaling, the UE 416 feeds back information in the new feedback Types 2a and 2b (eW1, wideband eW2 and wideband CQI). Of course, other combinations are encompassed by the present invention.

(2) In the case where PTI=1, the new feedback Types 2b and 1a will be discussed.

For the new feedback Type 1a:

If the serving BS 202 configures the UE 416 to use CB/CS in a semi-static manner via high layer signaling (e.g., RRC signaling) or MAC layer signaling, the UE 416 can feed back in the new feedback Type 1a:

one preferred sub-band location in a band part, CQI for the sub-band plus a sub-band eW2 (the sub-band eW2 can be obtained by increasing the number of elements in the value range of sub-band W2); or CQI for a sub-band preferred by the serving BS and a sub-band eW2 (the sub-band eW2 can be obtained by increasing the number of elements in the value range of sub-band W2).

In addition, the wideband CQI for the non-serving BS and the wideband CQI for the serving BS 202 can be differentially coded in order to control feedback overhead.

If the serving BS 202 configures the UE 416 to use JT in a semi-static manner via high layer signaling (e.g., RRC signaling) or MAC layer signaling, the UE 416 can feed back in the new feedback Type 1a:

one preferred sub-band location in a band part, CQI for the sub-band plus a sub-band W2 and PI(2) (PI(2) represents at least a part of information of PI); or CQI for a sub-band preferred by the serving BS plus a sub-band W2 and PI(2) (PI(2) represents at least a part of information of PI).

In addition, the wideband CQI for the non-serving 13S and the wideband CQI for the serving BS 202 can be differentially coded in order to control feedback overhead.

For the new feedback Type 2b:

If the serving BS 202 configures the UE 416 to use CB/CS in a semi-static manner via high layer signaling (e.g., RRC signaling) or MAC layer signaling, the UE 416 can feed back in the new feedback Type 2b:

a wideband eW2 and a wideband CQI (wideband eW2 can be obtained by increasing the number of elements in the value range of wideband W2).

In addition, the wideband CQI for the non-serving BS and the wideband CQI for the serving BS 202 can be differentially coded in order to control feedback overhead.

If the serving BS 202 configures the UE 416 to use JT in a semi-static manner via high layer signaling (e.g., RRC signaling) or MAC layer signaling, the UE 416 can feed back in the new feedback Type 2b:

a wideband W2, PI(3) and a wideband CQI (PI(3) represents at least a part of information of PI).

In addition, the wideband CQI for the non-serving BS and the wideband CQI for the serving BS 202 can be differentially coded in order to control feedback overhead.

It is to be noted that PI(1) and/or PI(2) and/or PI(3) should constitute the complete information of PI.

Further, the existing feedback Types 1a/2b can be combined with the above new feedback Types 1a/2b. For example, when the serving BS 202 configures the UE 416 to use CB/CS in a semi-static manner via high layer signaling (e.g., RRC signaling) or MAC layer signaling, the UE 416 feeds back information in the existing feedback Types 1a and 2b (one preferred sub-band location in a band part, CQI for the sub-band plus a sub-band W2, a wideband W2 and a wideband CQI); when the serving BS 202 configures the UE 416 to use JT in a semi-static manner via high layer signaling (e.g., RRC signaling) or MAC layer signaling, the UE 416 feeds back information in the new feedback Types 1a and 2b (one preferred sub-band location in a band part, CQI for the sub-band plus a sub-band W2, a wideband W2, a wideband CQI, PI(2) and PI(3)). Alternatively, when the serving BS 202 configures the UE 416 to use JT in a semi-static manner via high layer signaling (e.g., RRC signaling) or MAC layer signaling, the UE 416 feeds back information in the existing feedback Types 1a and 2b (one preferred sub-band location in a band part, CQI for the sub-band plus a sub-band W2, a wideband W2 and a wideband CQI); when the serving BS 202 configures the UE 416 to use CB/CS in a semi-static manner via high layer signaling (e.g., RRC signaling) or MAC layer signaling, the UE 416 feeds back information in the new feedback Types 1a and 2b (CQI for a sub-band preferred by the serving BS, a sub-band eW2, a wideband eW2 and a wideband CQI). Of course, other combinations are encompassed by the present invention.

Figure 7:
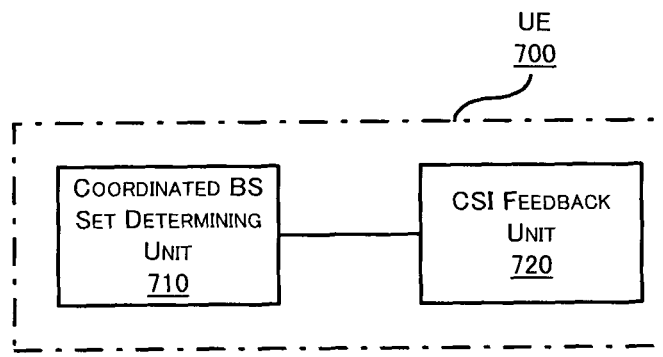
FIG. 7 is a schematic block diagram of a UE according to the present invention.

In order to implement the above CSI feedback method, a UE is also provided according to the present invention, FIG. 7 is a schematic block diagram of the UE according to the present invention. As shown in FIG. 7, the UE 700 according to the present invention includes a coordinated BS set determining unit 710 and a CSI feedback unit 720.

The coordinated BS set determining unit 710 can determine the set of coordinated BSs for the UE based on the non-serving BS(s) notified from the serving BS. Alternatively, the coordinated BS set determining unit 710 can autonomously determine the non-serving BS(s) participating in multi-BS coordination for the UE based on the path loss information measured by the UE 700, thereby determining the set of coordinated BSs. The set of coordinated BSs is composed of a serving BS and at least one non-serving BS.

The CSI feedback unit 720 feeds back CSI for the set of coordinated BSs to the serving BS according to the feedback design of the current system. Also, the CSI feedback unit 720 either (1) dynamically indicates whether the CSI feedback is for JT or for CB/CS by using a 1-bit CoMP Type Indicator (CTI) contained in the feedback information, or (2) determines whether to feed back CSI for JT or for CB/CS based on a system parameter configured by the serving BS in a semi-static manner via high layer signaling or MAC signaling, so as to feed back the CSI corresponding to the set of coordinated BSs to the non-serving BS(s). As to the specific CSI fed back by the CSI feedback unit 720 to the non-serving BS(s), reference can be made to the details of the above three examples (Examples 1-3 and Examples 1'-3'). For the sake of clarity and conciseness, the details of the CSI to be fed back are omitted here.

It should be noted that the solution of the present invention has been described above by a way of example only. However, the present invention is not limited to the above steps and element structures. It is possible to adjust, add and remove the steps and elements structures depending on actual requirements. Thus, some of the steps and elements are not essential for achieving the general inventive concept of the present invention. Therefore, the features necessary for the present invention is only limited to a minimum requirement for achieving the general inventive concept of the present invention, rather than the above specific examples.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:

1. A User Equipment (UE), comprising:
a memory; and
a central processing unit (CPU) configured to:
determine a set of coordinated BSs participating in multi-BS coordination, the set of coordinated BSs containing a serving BS and at least one non-serving BS; and
feed back CSI for Joint Transmission (JT) or Coordinated Beamforming/Coordinated Scheduling (CB/CS) for each non-serving BS in the set of coordinated BSs,
wherein the CPU is configured for determining whether to feed back CSI for JT or for CB/CS based on a system parameter configured by the serving BS in a semi-static manner via high layer signaling or MAC signaling,
the CPU is configured for feeding back different CSI in Sub-Mode 1 of feedback Mode 1-1 depending on whether the CSI to be fed back is for JT or for CB/CS, the CPU is configured for:
feeding back RI and W1 in the feedback Type 5; or
feeding back RI and eW1 in the new feedback Type 5 in case that the CSI to be fed back is for CB/CS, and
eW1 is obtained by increasing a down-sampled set of W1.

2. A User Equipment (UE), comprising:
a memory; and
a central processing unit (CPU) configured to:
determine a set of coordinated BSs participating in multi-BS coordination, the set of coordinated BSs containing a serving BS and at least one non-serving BS; and
feed back CSI for Joint Transmission (JT) or Coordinated Beamforming/Coordinated Scheduling (CB/CS) for each non-serving BS in the set of coordinated BSs,
wherein the CPU is configured for indicating whether the fed back CSI is for JT or for CB/CS by using a Coordinated Multi-Point (CoMP) Type Indicator (CTI) in the CSI fed back to each non-serving BS,
the CPU is configured for including the CTI in a feedback Type 5 to form a new feedback Type 5 in Sub-Mode 1 of feedback Mode 1-1, and feeding back different CSI in Sub-Mode 1 of feedback Mode 1-1 depending on whether the CSI to be fed back is for JT or for CB/CS,
the CPU is configured for forming a new feedback Type 2b and feeding back wideband eW2 and wideband CQI in the new feedback Type 2b in case that the CSI to be fed back is for CB/CS, and
the wideband eW2 is obtained by increasing a number of elements in a value range of the wideband W2.

3. A User Equipment (UE), comprising:
a memory; and
a central processing unit (CPU) configured to:
determine a set of coordinated BSs participating in multi-BS coordination, the set of coordinated BSs containing a serving BS and at least one non-serving BS; and
feed back CSI for Joint Transmission (JT) or Coordinated Beamforming/Coordinated Scheduling (CB/CS) for each non-serving BS in the set of coordinated BSs,
wherein the CPU is configured for indicating whether the fed back CSI is for JT or for CB/CS by using a Coordinated Multi-Point (CoMP) Type Indicator (CTI) in the CSI fed back to each non-serving BS,
the CPU is configured for including the CTI in a feedback Type 3 to form a new feedback Type 3 in Sub-Mode 2 of feedback Mode 1-1, and feeding back different CSI in Sub-Mode 2 of feedback Mode 1-1 depending on whether the CSI to be fed back is for JT or for CB/CS,
the CPU is configured for forming a new feedback Type 2c and feeding back wideband CQI, eW1 and wideband eW2 in the new feedback Type 2c in case that the CSI to be fed back is for CB/CS, and
eW1 is obtained by increasing a down-sampled set of W1 and the wideband eW2 is obtained by increasing the down-sampled set of wideband W2.

4. A User Equipment (UE), comprising:
a memory; and
a central processing unit (CPU) configured to:
determine a set of coordinated BSs participating in multi-BS coordination, the set of coordinated BSs containing a serving BS and at least one non-serving BS; and
feed back CSI for Joint Transmission (JT) or Coordinated Beamforming/Coordinated Scheduling (CB/CS) for each non-serving BS in the set of coordinated BSs, wherein the CPU is configured for indicating whether the fed back CSI is for JT or for CB/CS by using a Coordinated Multi-Point (CoMP) Type Indicator (CTI) in the CSI fed back to each non-serving BS, the CPU is configured for including the CTI in a feedback Type 6 to form a new feedback Type 6 in feedback Mode 2-1, and feeding back different CSI in the feedback Mode 2-1 depending on whether the CSI to be fed back is for JT or for CB/CS, the CPU is configured for forming a new feedback Type 2b and feeding back wide band eW2 and wideband CQI in the new feedback Type 2b in case that the CSI to be fed back is for CB/CS, and the wideband eW2 is obtained by increasing a number of elements in a value range of the wideband W2.

* * * * *